United States Patent [19]

Spelthann

[11] Patent Number: 5,395,881
[45] Date of Patent: Mar. 7, 1995

[54] FLEXIBLE POLAR THERMOPLASTIC POLYOLEFIN COMPOSITIONS

[75] Inventor: Heinz H. Spelthann, Geneva, Switzerland

[73] Assignee: E. I. Du Pont de Nemours and Company, Wilmington, Del.

[21] Appl. No.: 205,427

[22] Filed: Mar. 4, 1994

[51] Int. Cl.$^6$ .................. C08G 67/02; C08L 23/08; C08L 23/26
[52] U.S. Cl. .................. 525/63; 525/74; 525/185; 525/190; 525/64
[58] Field of Search .............. 525/74, 63, 64, 185, 525/190

[56] References Cited

U.S. PATENT DOCUMENTS

| | | | |
|---|---|---|---|
| 3,856,889 | 12/1974 | McConnell | 525/74 |
| 4,684,576 | 8/1987 | Tabor et al. | 525/74 |
| 5,089,556 | 2/1992 | Tabor et al. | 525/419 |
| 5,209,983 | 5/1993 | Case et al. | 525/185 |
| 5,277,947 | 1/1994 | Case et al. | 525/208 |
| 5,278,233 | 1/1994 | Abe et al. | 525/74 |

FOREIGN PATENT DOCUMENTS

| | | | |
|---|---|---|---|
| 0002358 | 1/1983 | Japan | 525/74 |
| 2081723 | 2/1982 | United Kingdom | 525/74 |

*Primary Examiner*—James J. Seidlick
*Assistant Examiner*—Thomas Hamilton, III
*Attorney, Agent, or Firm*—Craig H. Evans

[57] ABSTRACT

Polar thermoplastic polyolefin blends are provided which are flexible and are particularly useful in replacing polyvinyl chloride sheeting used as liners, folders, etc.. The blends comprise, in general, a non-polar thermoplastic polyolefin, a polar ethylene copolymer, an epoxy functionalized polar ethylene copolymer, and a carboxylic acid or anhydride functionalized olefin polymer, all of which are chlorine-free.

13 Claims, No Drawings

FLEXIBLE POLAR THERMOPLASTIC POLYOLEFIN COMPOSITIONS

BACKGROUND OF THE INVENTION

1. Field of Invention

This invention relates to polyolefin compositions and more particularly to such compositions which are flexible and polar, and to shaped articles made from them.

2. Background Discussion

Polyvinyl chloride (PVC) sheets have been on the market for many years and have been the standard liner material in the housing industry. PVC sheets are characterized by being flexible over a variable temperature range, heat-sealable, and oil-resistant. However, with the trend toward a chlorine-free environment, there is a need for a PVC sheeting alternative. Ethylene/propylene/diene monomer (EPDM) rubbers are alternatives, but these are difficult to seal. Thus, there is a need for PVC-free sheets which are thermoplastic and heat-sealable, halogen-free and flexible.

SUMMARY OF THE INVENTION

According to the present invention there is provided a flexible, nonhalogen-containing polymer composition which comprises a blend of:
(1) 10% -90% by weight of a thermoplastic polymer component comprising:
  (a) 90–99.9% by weight of a non-polar thermoplastic polyolefin; and
  (b) 0.1–10% by weight of a compatibilizing polymer which is an olefin polymer containing less than 20% by weight of a copolymerized polar monomer, and containing 0.01–10% by weight of a carboxylic acid or a derivative thereof; and
(2) 90% -10% by. weight of a polar thermoplastic polymer component comprising:
  (a) 70–99.9% by weight of a polar ethylene copolymer consisting essentially of
    (i) 30–80% by weight of ethylene;
    (ii) 5–60% by weight of at least one copolymerizable, ethylenically unsaturated organic compound; and
    (iii) 3–30% by weight of carbon monoxide; and
  (b) 0.1–30% by weight of a polar ethylene compatibilizing copolymer consisting essentially of:
    (i) 30–80% by weight of ethylene;
    (ii) 0–60% by weight of at least one copolymerizable, ethylenically unsaturated organic compound; and
    (iii) 0.5–30% by weight of glycidyl acrylate or methacrylate.

Also provided is a shaped article such as a sheet or film made from the aforesaid composition.

DETAILED DESCRIPTION OF THE INVENTION

The invention relates to flexible, nonhalogen-containing thermoplastic polymer blends which are useful in sheet form as liners for roofing, etc. or for making folders, and in film form as packaging films. These blends generally are formed by combining a non-polar thermoplastic polyolefin component with a soft, polar thermoplastic ethylene copolymer component. Reactive compatibilizing agents are used in order to affect the blends and to give good properties to resulting shaped articles. Such polymer blends can be formed into sheets, films, and other shaped articles which have many properties comparable to polyvinyl chloride (PVC), but with better elongation and with no chlorine.

The polymer blends of the invention comprise 10–90% by weight of a thermoplastic polymer component, preferably 50–90% by weight, most preferably 60–90% by weight, and 90–10% by weight of a polar thermoplastic polymer component, preferably 50–10% by weight, most preferably 40–10% by weight. The term "non-polar thermoplastic polyolefin" (component (1) (a) means any polyolefin polymer which is thermoplastic but which excludes polar ethylene copolymers as defined herein. In general, these polyolefins will have a melt flow index (MFI) in the range of 0.01–100 g/10 min., preferably less than 5 g/10 min. as determined by ASTM D-1238 (measured at 2,16 kg and 190° C. or 230° C. depending on the polyolefin used) and are well-known in the art. Useful and preferred polyolefins are high density polyethylene (HDPE) and polypropylene. Other polyolefin homopolymers and copolymers of ethylene can be utilized in the practice of this invention. Such other polyolefins include low density polyethylene (LDPE), very low density polyethylene (VLPE), linear low density polyethylene (LLDPE) and polybutylene (PB). However, these other polyolefins can be blended with other polyolefins such as polypropylene ("PP") or high density polyethylene ("HDPE"). As used herein the term "polypropylene" includes homopolymers of propylene as well as copolymers of polypropylene which can contain about 1 to about 20 weight percent ethylene or an alpha olefin comonomer of 4 to 16 carbon atoms. The polypropylene can be highly crystalline isotactic or syndiotactic polypropylene. The copolymer can be either a random or block copolymer. The density of the PP or copolymer can be from about 0.88 to about 0.92 g/cc; generally, from about 0.89 to about 0.91 g/cc.

High density polyethylene useful as a polyolefin resin of this invention, has a density of about 0.941 to about 0.965 g/cc. High density polyethylene is an established product of commerce and its manufacture and general properties are well known to the art. Typically, HDPE has a relatively broad molecular weight distribution, characterized by the ratio of weight average molecular weight to number average molecular weight of from about 20 to about 40.

Low density polyethylene (LDPE) as used herein means both low and medium density polyethylene having densities of about 0.910 to about 0.940 g/cc. The terms include linear polyethylene as well as copolymers of ethylene which are thermoplastic resins, but non-polar.

Very low density polyethylene (VLDPE) is used herein to mean polyethylene having a density below about 0.910 g/cc and includes linear polyethylene as well as copolymers of ethylene which are thermoplastic resins, but non-polar.

Linear low density polyethylene (LLDPE) is a class of low density polyethylene characterized by little, if any, long chain branching, in contrast to conventional LDPE. The processes for producing LLDPE are well known in the art and commercial grades of this polyolefin are available. The term LLDPE means copolymers of ethylene and other alpha-olefins such as 1-butene, 1-hexene, and 1-octene. Useful LLDPEs have both high and low molecular weights. Such copolymers with 1-butene tend to be more crystalline and thus are more useful as roofing liners; whereas such copolymers with 1-octene are clearer and perhaps more useful in packaging applications. The LLDPEs are preferred.

Polybutylene includes both poly (1-butene) homopolymer and a copolymer with, for example, ethylene, propylene, pentene-1, etc. Commercially useful products are of high molecular weight and isotacticity. A variety of commercial grades of both homopolymer and ethylene-butene-1 copolymers are available with melt flow indices that range from about 0.3 to about 20 g/10 min.

Any of the aforesaid olefin polymers can also be blended with 10 to 70% by weight (preferably 10-40%) of an ethylene-propylene copolymer rubber (EP), including an ethylene/propylene/nonconjugated diene copolymer rubber (EPDM), both of which are well-known in the art. The nonconjugated dienes can contain from 6-22 carbon atoms having at least one readily polymerizable double bond. The ethylene/propylene copolymer rubber contains about 60-80 weight percent, usually about 65-75 weight percent ethylene. The amount of nonconjugated diene, when used, is generally from about 1-7 weight percent, usually 2-5 weight percent. Preferably the ethylene/propylene copolymer rubbers are EPDM copolymers. EPDM copolymers that are especially preferred are ethylene/ propylene/1.4-hexadiene, ethylene/propylene/dicylopentadiene, ethylene/propylene/norbornene, ethylene/propylene/methylene-2-norbornene, and ethylene/propylene/1.4-hexadiene/norbornadiene copolymers. These polymeric rubbers will generally have a Mooney viscosity as measured by ASTM D-1646 (1+4/121° C.) in the range of 20-50. Blends of polypropylene with EP rubbers are available commercially from Himont Inc. as elastomeric polyolefins and are sold under the name HIFAX (e.g., HIFAX FX7023 XEP; HIFAX FX7036 XCP). Compatibilizing polymer (1) (b) can be an olefin polymer such as described above, which has been functionalized by copolymerizing or grafting a carboxylic acid or derivative thereof (such as an anhydride) to the polymer by known processes. Any of the above-described non-polar thermoplastic polyolefins (including the EP and EPDM rubbers) can be subjected to the functionalizing process. A polyolefin is graft modified with 0.01 to 10.0 weight percent, preferably 0.05 to 2 weight percent, of a carboxylic acid or a derivative thereof. The grafting of the polyolefin can be carried out in the melt state, in solution or in suspension as described in the state-of-the-art literature. The melt viscosity of the modified polyolefin is not restricted, however, most effective compatibilization with modified polypropylene is found if the melt index, measured according to ASTM D-1238 (at 2.16 kg and 190° C.) is between 50 to 150 g/10 min. and with modified polyethylene if the melt index (measured at 2.16 kg and 190° C.) is less than 6 g/10 min., respectively. Maleic anhydride is the preferred functionalizing agent. Such modified polyolefins can be prepared as described, for example, in published European Patent Application Nos. 370,735 and 370,736.

The grafting monomer for the olefin polymer is at least one of alpha, beta-ethylenically unsaturated carboxylic acids and anhydrides, including derivatives of such acids and anhydrides, and including mixtures thereof. Examples of the acids and anhydrides, which may be mono-, di- or polycarboxylic acids, are acrylic acid, methacrylic acid, maleic acid, fumaric acid, itaconic acid, crotonic acid, itaconic anhydride, maleic anhydride and substituted maleic anhydride e.g. dimethyl maleic anhydride. Examples of derivatives of the unsaturated acids are salts, amides, imides and esters e.g. mono- and disodium maleate, acrylamide, maleimide and diethyl fumarate. Maleic anhydride is preferred.

Comptabilizing polymer (1)(b) can also be an olefin polymer which contains up to 20% by weight of a copolymerized polar monomer. Such polar monomers are one or more of vinyl acetate and alkyl acrylates or methacrylates wherein the alkyl groups are from 1-8 carbon atoms. Ethylene vinyl acetate (EVA) copolymers are preferred. These polar-containing copolymers can be grafted with maleic anhydride and other alpha, beta-ethylenically unsaturated acids and anhydrides according to the known, above-described procedures.

Polar ethylene copolymers (2) (a) useful in the blends of this invention and their preparation are described in U.S. Pat. No. 3,780,140 to Hammer, the description of which is incorporated by reference. These polar copolymers comprise 70-99.9% by weight of the polar thermoplastic polymer component, preferably 75-90% by weight.

These polar ethylene copolymers preferably consist essentially of ethylene, carbon monoxide and one or more termonomers which are chlorine-free and are copolymerizable ethylenically unsaturated organic compounds. Such termonomers are selected from the class consisting of non-chlorine containing unsaturated mono- and dicarboxylic acids of 3-20 carbon atoms, esters of such unsaturated mono- or dicarboxylic acids, vinyl esters of saturated carboxylic acids wherein the acid group has 1-18 carbon atoms, vinyl alkyl ethers wherein the alkyl group has 1-18 carbon atoms, acrylonitrile, methacrylonitrile, copolymerizable unsaturated hydrocarbons such as alpha-olefins of 3-12 carbon atoms, ring compounds such as norbornene and vinyl aromatic compounds.

In particular, these copolymers consist essentially of, by weight, (a) 30-80% ethylene, (b) 3-30% carbon monoxide, and (c) 5-60% of one or more termonomers copolymerizable therewith to produce solid copolymers. Preferred copolymers include those consisting essentially of 56-76% ethylene, 3-15% carbon monoxide, and 10-34% of said termonomer(s). More preferred copolymers include those in which vinyl acetate or an alkyl (1-8 carbons) acrylate or alkyl methacrylate (particularly n butyl acrylate) is the termonomer. The copolymers normally have a melt flow index within the range 0.1-1000 g/10 min., preferably 1-500, measured according to ASTM D-1238. Most preferably, the melt index is less than 100 g/10 min.

The polar ethylene copolymer compatibilizing polymer (2) (b) is prepared by copolymerizing an unsaturated epoxide monomer of 4-11 carbon atoms by known processes with ethylene and optionally with another copolymerizable ethylenically unsaturated organic compound. Illustrative epoxide monomers are glycidyl ether, glycidyl acrylate, glycidyl methacrylate, allyl glycidyl ether, vinylglycidyl ether and glycidyl itaconate. Preferred optional monomers are alkyl acrylates and methacrylates where the alkyl groups contain 1-8 carbon atoms, carbon monoxide, sulfur dioxide, and vinyl ether. These polar copolymer compatibilizing polymers comprise 0.1-30% by weight of the polar thermoplastic polymer component, preferably 10-25% by weight.

Preferred compatibilizing polymers (2)(b) for use in the compositions of the present invention include ethylene/glycidyl acrylate, ethylene/n-butyl acrylate/- glycidyl acrylate, ethylene/methyl acrylate/glycidyl acrylate, ethylene/glycidyl methacrylate, ethylene/n-butyl acrylate/glycidyl methacrylate and ethylene/methyl acrylate/glycidyl methacrylate copolymers. The most preferred polymers for use in the compositions of the present invention are copolymers derived from ethylene/n-butyl acrylate/glycidyl methacrylate and ethylene/glycidyl methacrylate.

Typically, these polymers will have a melt index of 1–50 g/10 minutes.

The blends of the invention can be prepared by mixing the polymeric ingredients and optional additives by use of conventional masticating equipment, for example, a rubber mill, Brabender Mixer, Banbury Mixer, Buss-ko kneader, Farrel continuous mixer, or twin screw continuous mixer. Mixing times should be sufficient to obtain homogeneous blends. Satisfactory mixing times depend upon the types of polymers and upon the type and amount of compatibilizer. Typically, mixing times of about 5 minutes are satisfactory. If the polymer blend is obviously non-homogeneous, additional mixing is required.

In addition to its polymer components, the composition of this invention can include reinforcing and non-reinforcing fillers, antioxidants, stabilizers, lubricants (e.g., oleamide), antiblocking agents, antistatic agents, waxes, coupling agents for fillers, pigments, fire retardants, titanium dioxide, talc and other processing aids known in the polymer compounding art. These pigments and other additives comprise 0 to about 50 weight percent of the total composition preferably 5 to 30 weight percent of a filler.

The invention can be further understood by the following examples in which parts and percentages are by weight and temperatures are in degrees Celsius.

DESCRIPTION OF THE PREFERRED EMBODIMENTS

EXAMPLES 1–4

The following polymers were used in the Examples and Controls:

| | |
|---|---|
| PP-EP | A polypropylene modified with an ethylene-propylene copolymer rubber having a MFI (190° C./2.16 kg) = 0.8 (HIFAX FX7036 XCP sold by Himont, Inc.). |
| EnBACO1 | An ethylene terpolymer having a MFI (190° C./2.16 kg) = 12 (57% ethylene, 30% n-butylacrilate, and 13% CO). |
| EnBACO2 | Same as EnBACO1 except having 10% CO. |
| ENBAGMA | An ethylene terpolymer having a MFI (190° C./2.16 kg) = 12 (67% ethylene, 28% n-butylacrilate, and 5% glycidyl methacrylate). |
| EVA-g-MAH1 | An ethylene/vinyl acetate copolymer (18% VA) grafted with 1% of maleic anhydride having a MFI (190° C./2.16 kg) = 175. |
| EVA-g-MAH2 | Same as EVA-g-MAH1 except having a MFI (190° C./2.16 kg) = 2.5 |
| EPM-g-MAH1 | An ethylene/propylene copolymer rubber grafted with maleic anhydride having a MFI (230° C./10 kg) = 9 (EXXELOR VA 1801 sold by Exxon). |
| EPM-g-MAH2 | Same as EPM-G-MAH1 except having a MFI (230° C./10 kg) = 35 (EXXELOR VA 1803). |
| EPDM-g-MAH | An ethylene/propylene/hexadiene rubber grafted with 1% maleic anhydride having a MFI (280° C./2.16 kg) = 14 (70% ethylene, 23% propylene, 6% hexadiene, and 1% maleic anhydride). |

Polymeric blends were prepared by melt compounding the polymeric components and 1% of the blend of an antioxidant. Melt compounding of each blend was carried out in a Brabender internal mixer with batches from 45–50 grams at 190° C. at a speed of 80 rpm for ca. 5 minutes. The melt then was removed and sheeted out on a laboratory two-roll mill at 170°. The milled sheet then was formed into a testing plaque in a hydraulic press at 180° for 5 minutes. Afterwards, stress-strain testing (ASTM D-638) carried out. Results are shown in Table 1.

TABLE 1

| Example No. | 1 | 2 | 3 | 4 | Control 1 | 5 | Control 2 | 6 | Control 3 |
|---|---|---|---|---|---|---|---|---|---|
| PP-EP | 76 | 76 | 76 | 76 | 80 | 60 | 70 | 60 | 70 |
| EnBACO1 | 16 | 16 | 16 | 16 | 20 | 30 | 30 | — | — |
| EnBACO2 | — | — | — | — | — | — | — | 30 | 30 |
| EPDM-g-MAH1 | 4 | — | — | — | — | — | — | — | — |
| EPM-g-MAH1 | — | 4 | — | — | — | — | — | — | — |
| EVA-g-MAH1 | — | — | 4 | — | — | 5 | — | 5 | — |
| EVA-g-MAH2 | — | — | — | 4 | — | — | — | — | — |
| EnBAGMA | 4 | 4 | 4 | 4 | — | 5 | — | 5 | — |
| Properties | | | | | | | | | |
| TS (mPa) | 12 | 13.6 | 16.3 | 14.8 | 16.5 | 7.1 | 7.2 | 10.1 | 5.9 |
| EB (%) | 714 | 729 | 775 | 737 | 747 | 530 | 560 | 700 | 380 |
| EY (%) | 14 | 17 | 29 | 29 | 27 | 30 | 16 | 40 | 30 |

What is claimed is:

1. A flexible, nonhalogen-containing polymer composition which comprises a blend of:
   (1) 10%–90% by weight of a thermoplastic polymer component comprising:
      (a) 90–99.9% by weight of a non-polar thermoplastic polyolefin; and
      (b) 0.1–10% by weight of a compatibilizing polymer which is an olefin polymer containing less than 20% by weight of a copolymerized polar monomer, and containing 0.01–10% by weight of a carboxylic acid or a derivative thereof; and
   (2) 90%–10% by weight of a polar thermoplastic polymer component comprising:
      (a) 70–99.9% by weight of a polar ethylene copolymer consisting essentially of
         (i) 30–80% by weight of ethylene;
         (ii) 5–60% by weight of at least one copolymerizable, ethylenically unsaturated organic compound; and
         (iii) 3–30% by weight of carbon monoxide; and
      (b) 0.1–30% by weight of a polar ethylene compatibilizing copolymer consisting essentially of:
         (i) 30–80% by weight of ethylene;
         (ii) 0–60% by weight of at least one copolymerizable, ethylenically unsaturated organic compound; and (iii) 0.5–30% by weight of glycidyl acrylate or methacrylate.

2. A flexible polymer composition of claim 1 wherein the reactive groups of the compatibilizing polymer and the reactive groups of the polar ethylene compatibilizing copolymer have reacted.

3. A flexible polymer composition of claim 1 wherein the non-polar thermoplastic polyolefin is polypropylene, high density polyethylene, a linear low density polyethylene, or a blend of one of the above with an ethylene-propylene rubber or an ethylene-propylene-diene rubber.

4. A flexible polymer composition of claim 1 wherein the compatibilizing polymer is polypropylene, high density polyethylene, a linear low density polyethylene, an ethylene-propylene copolymer rubber, an ethylene-propylene-diene rubber, or a blend of any of the above, said compatibilizing polymer grafted with 0.05–2% by weight of a carboxylic acid or an anhydride thereof.

5. A flexible polymer composition according to claim 4 wherein the compatibilizing olefin polymer is (a) a maleic acid or maleic anhydride grafted polypropylene, or (b) a maleic acid or maleic anhydride grafted polyethylene, or an ethylene-propylene copolymer rubber, a linear low density polyethylene, or (c) a maleic acid or maleic anhydride grafted ethylene/vinyl acetate copolymer of less than 20% by weight vinyl acetate.

6. A flexible polymer composition of claim 1 wherein the polar ethylene copolymer consists essentially of:
   (i) 56–76% by weight ethylene;
   (ii) 10–34% by weight of vinyl acetate or an alkyl acrylate or alkyl methacrylate, wherein the alkyl group is from 1–8 carbon atoms; and
   (iii) 3–15% by weight of carbon monoxide.

7. A flexible polymer composition of claim 1 wherein the polar ethylene compatibilizing copolymer consists essentially of:
   (i) 56–76% by weight of ethylene;
   (ii) 10–34% by weight of vinyl acetate or an alkyl acrylate or alkyl methacrylate, wherein the alkyl group is from 1–8 carbon atoms; and
   (iii) 0.5–15% by weight of glycidyl acrylate or methacrylate.

8. A flexible polymer composition of claim 1 wherein the blend comprises (1) 50–90% by weight of the thermoplastic polymer component which comprises:
   (a) 90–99.9% by weight of a non-polar thermoplastic polyolefin; and
   (b) 0.1–10% by weight of a compatibilizing olefin polymer which is polypropylene, high density polyethylene, a linear low density polyethylene, an ethylene-propylene copolymer rubber, an ethylene-propylene-diene rubber, or a blend of any of the above, said compatibilizing polymer grafted with 0.05–2% by weight of a carboxylic acid or an anhydride thereof; and
(2) 10–50% by weight of the polar thermoplastic polymer component which comprises:
   (a) 75–90% by weight of a polar ethylene copolymer which consists essentially of:
      (i) 56–76% by weight ethylene;
      (ii) 10–34% by weight of vinyl acetate or an alkyl acrylate or alkyl methacrylate, wherein the alkyl group is from 1–8 carbon atoms; and
      (iii) 3–15% by weight of carbon monoxide; and
   (b) 10–25% by weight of a polar ethylene compatibilizing copolymer which consists essentially of:
      (i) 56–76% by weight of ethylene;
      (ii) 10–34% by weight of vinyl acetate or an alkyl acrylate or alkyl methacrylate, wherein the alkyl group is from 1–8 carbon atoms; and
      (iii) 0.5–15% by weight of glycidyl acrylate or methacrylate.

9. A flexible polymer composition of claim 1 wherein the blend comprises 50%–90% by weight of polymer component (1) and 50%–10% by weight of polymer component (2).

10. A flexible polymer composition of claim 8 wherein the blend comprises 60%–90% of polymer component (1) and 40%–10% of polymer component (2).

11. A flexible polymer composition of claim 1 wherein additives are contained in the composition up to 50% by weight of the total composition.

12. A flexible composition of claim 1 in the form of a shaped article.

13. A flexible composition of claim 8 in the form of a shaped article.

* * * * *